United States Patent [19]

Brode

[11] Patent Number: 4,490,151
[45] Date of Patent: Dec. 25, 1984

[54] DISAZO SULFOPHENYLPYRAZOLONESTILBENE DYES AND DIRECT DYES TO COLOR CELLULOSE BLACK

[75] Inventor: David A. Brode, Birdsboro, Pa.

[73] Assignee: Crompton and Knowles Corporation, New York, N.Y.

[21] Appl. No.: 549,404

[22] Filed: Nov. 7, 1983

Related U.S. Application Data

[62] Division of Ser. No. 334,232, Dec. 24, 1981, Pat. No. 4,455,258.

[51] Int. Cl.³ .................... C09B 29/00; C09B 33/02
[52] U.S. Cl. .................................. 8/639; 8/681; 8/687; 8/690; 8/918; 8/919; 534/689; 534/691
[58] Field of Search ............................................. 8/639

[56] References Cited

U.S. PATENT DOCUMENTS

| | | | |
|---|---|---|---|
| 1,697,122 | 1/1929 | Krech et al. | 260/160 |
| 1,821,290 | 9/1931 | Brightman | 260/160 |
| 1,869,064 | 7/1932 | Krebser | 260/160 |
| 2,241,795 | 5/1941 | Taube et al. | 260/161 |
| 2,395,135 | 2/1946 | Mendoza et al. | 260/151 |
| 2,571,990 | 10/1951 | Stratton | 260/160 X |
| 2,646,338 | 7/1953 | Kappeler et al. | 260/160 X |
| 2,681,926 | 6/1954 | Lane et al. | 260/160 X |
| 2,714,587 | 8/1955 | Neier et al. | 260/160 X |
| 3,299,040 | 1/1967 | Jeremias et al. | 260/160 |
| 4,250,091 | 2/1981 | Papa et al. | 260/160 |

*Primary Examiner*—A. Lionel Clingman
*Attorney, Agent, or Firm*—Synnestvedt & Lechner

[57] ABSTRACT

New disazo sulphophenyl pyrazolone-sulpho stilbene compounds are useful as orange-hued dyes for cellulosic having excellent color stability over a wide pH range and when in aqueous solution are useful as liquid paper black dyes.

18 Claims, No Drawings

DISAZO SULFOPHENYLPYRAZOLONESTILBENE DYES AND DIRECT DYES TO COLOR CELLULOSE BLACK

This application is a division of application Ser. No. 334,232, filed Dec. 24, 1981 and now U.S. Pat. No. 4,455,258.

This invention relates to a new group of disazo sulfophenylpyrazolone stilbene compounds that are useful as orange hued dyes for cellulosics. The new compounds have special utility for making black dye mixes. When they are mixed with certain direct blue dyes and also with combinations of certain direct blue and yellow dyes, they form dye mixtures that are highly soluble in water and can effectively function as liquid black paper dyes with unique stability properties; specifically, they are highly stable and do not change hue over a wide range of pH conditions and this simplifies the problem of the dyer in matching and maintaining uniformity of hue.

The disazosulfophenylpyrazolone-stilbene compounds of this invention have the structure:

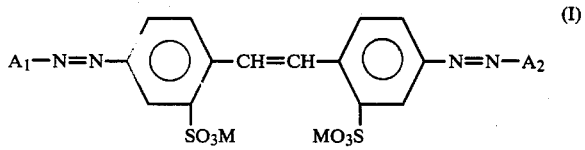

(I)

wherein $A_1$ and $A_2$ can be the same or different and represent the residue of a sulfophenylpyrazolone compound having the following structure:

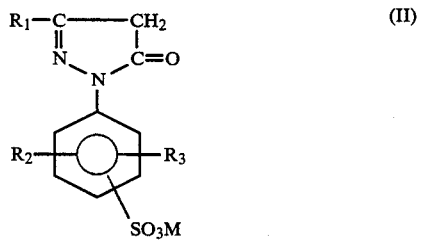

(II)

wherein:

$R_1$ is —$CH_3$, —COOH and —COO-lower alkyl;

$R_2$ and $R_3$ independently of one another represent — H, lower alkyl, -lower alkoxy and -halogen (especially —Br and —Cl); and M represents the same or different water solubilizing cations; and the preferred water solubilizing cations are one or more of the following: —H, —Na, —K, —Li, —N(R)$_3$H wherein R is —H, a single -lower alkyl substituent, or -lower hydroxyalkyl and each of the R groups can be the same or different. Where the compound is to be used in the formulation of liquid black paper dyes as will be described hereinafter, it is preferred that both —Li and —N(CH$_2$CH$_2$OH)$_3$ be simultaneously present as water solubilizing cations.

The disazosulfophenylpyrazolone-stilbene compounds of Structure I are made by conventional reactions: tetrazotizing 4,4'-diaminostilbene-2,2'-disulfonic acid and coupling the tetrazonium salt with a pyrazolone compound having the Structure II. The water solubilizing cation M present in the Structure I compounds will depend on the particular cation or cations present in the reaction mass or used to control the pH during the making of the compound. M can be varied in accordance with conventional well-known techniques. The preferred water solubilizing cations are one or more of the following: —H, —Na, —K, —Li, —N(R)$_3$H wherein R is —H, lower alkyl, or lower hydroxyalkyl (however, where R is lower alkyl only one of the R substituents can be lower alkyl); moreover, each of the R groups can be the same or different. The desired ion or ions should, therefore, be present during the coupling and/or neutralization reactions employed in the making of the compound.

Where the compound is to be used in making liquid black paper dyes, it is preferred that both —Li and —N(CH$_2$CH$_2$OH)$_3$ be simultaneously present as water solubilizing cations.

Suitable Structure II pyrazolones for purposes of this invention include:

1-(4'-sulfophenyl)-3-methyl-5-pyrazolone
1-(3'-sulfophenyl)-3-methyl-5-pyrazolone
1-(2',5'-dichloro-4'-sulfophenyl-3-methyl-5-pyrazolone
1-(2'-chloro-5'-sulfophenyl)-3-methyl-5-pyrazolone
1-(2'-methyl-4'-sulfophenyl)-3-methyl-5-pyrazolone
1-(2',5'-dimethyl-4'-sulfophenyl)-3-methyl-5-pyrazolone
1-(2,5'-dimethoxy-4'-sulfophenyl)-3-methyl-5-pyrazolone
1-(4'-sulfophenyl)-3-carboxy-5-pyrazolone
1-(3'-sulfophenyl)-3-carboxy-5-pyrazolone
1-(2'-chloro-5'-sulfophenyl)-3-carboxy-5-pyrazolone
1-(4'-sulfophenyl)-3-carbomethoxy-5-pyrazolone
1-(2'-sulfophenyl)-3-carboethoxy-5-pyrazolone
1-(4'-sulfophenyl)-3-carboethoxy-5-pyrazolone
1-(2'-chloro-5'-sulfophenyl)-3-carboethoxy-5-pyrazolone and for economic reasons and performance properties, and preferred pyrazolones are: 1-(4'-sulfophenyl)-3-methyl-5-pyrazolone; 1-(3'-sulfophenyl)-3-methyl-5-pyrazolone; 1-(2'-chloro-5'-sulfophenyl)-3-methyl-5-pyrazolone; and 1-(2',5'-dichloro-4'-sulfophenyl)-3-methyl-5-pyrazolone.

The Structure I compounds are readily water soluble, impart orangish hues to cellulosics and they exhibit excellent color stability over a wide pH range from about 3 to 10—i.e., the ranges most frequently encountered in the dyeing of paper or paper stock. Therefore, the Structure I compounds provide excellent orange hued dyes that can be mixed with certain direct blue dyes or mixed with mixtures of certain direct blue and direct yellow dyes to form black dyes that have sufficient water solubility to enable the mixtures to be sold as liquid dyes for cellulosics—and especially as liquid black paper dyes. These mixtures can include the orange and blue dye components or the orange, blue and yellow dye components in widely varying proportions— depending on the particular black hue desired.

The Structure I compounds can be mixed with any water soluble direct blue dye to provide black hues for cellulosics, however, where liquid black paper dyes are desired, the preferred blue dyes are those having the structure:

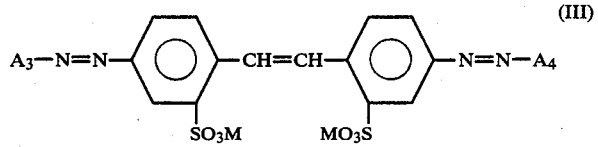

wherein $A_3$ and $A_4$ are the same or different substituents selected from the following:

(a) 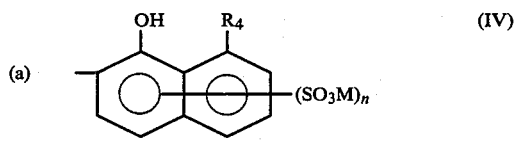

wherein $R_4$ is —OH or —$NH_2$; n is 1 or 2 and M is a water solubilizing cation; or (b) 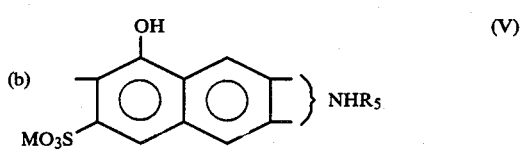

wherein $R_5$ is —H, -lower alkyl, -phenyl, —CO Alkyl, —CO Aryl ( the preferred —CO Aryl is —CO phenyl) or —$CH_2COOH$ and M is a water solubilizing cation and can be varied and controlled in the same manner as in the Structure I compound.

The Structure III compounds are made by conventional reactions: tetrazotizing 4,4'-diaminostilbene-2,2'-disulfonic acid and coupling the tetrazonium salt with one or more naphthol sulfonic acids—preferably H-Acid, K-Acid, Chicago Acid, Chromotropic Acid, Gamma Acid, J-Acid, S-Acid, Phenyl Gamma Acid, Phenyl J-Acid, Methyl Gamma Acid, Methyl J-Acid or Carboxy Methyl Acid. For reasons of economy and performance properties when in admixture with Structure I compounds, the preferred naphtholsulfonic acid is H-Acid which gives a dye having the structure:

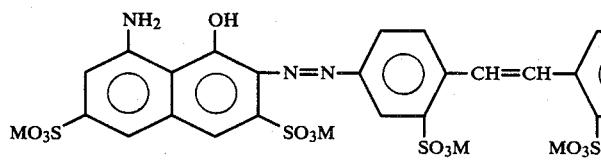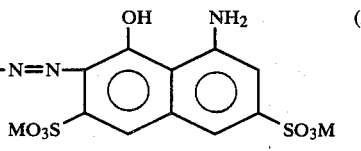

Readily water soluble black dyes for cellulosics can be prepared by admixing Structure I and Structure III compounds; the resulting mixes can be prepared and marketed as liquid dyes (i.e., stable, highly concentrated dye solutions containing up to about 25% color in solution) that maintain their color stability over a wide pH range of about 3 to 10. They also exhibit outstanding substantivity to paper making them useful for dyeing paper and paper stock in black to grey hues. Urea or another compatible cosolvent such as ε-caprolactam (usually about 5 to 10% by weight of the concentrated liquid dye) is desirably present in the liquid dye. Also, for liquid dye end uses, it is preferred that both —Li and —$N(CH_2CH_2OH)_3$ be present as the water solubilizing cations of the dye components and that the amount of —Na be minimized so as to maximize the water solubility and minimize coprecipitation of the dyes. Depending on the particular black hue desired, the relative concentrations are not particularly critical, can be varied over very wide ranges; however, generally the concentration of the blue dye should predominate.

In order to develop certain black hues—particularly on paper or paper stock—it is often desirable to incorporate a direct yellow dye in the mixes of the Structure I and II compounds. Any water soluble direct yellow dye can be so blended to provide black hues on cellulosics. However, to maintain the high level of pH stability of the orange-blue mix, the yellow dye should be one that does not have a phenolic hydroxyl group in its structure; and if the orange-blue-yellow mix is intended for use as a liquid black paper dye, the yellow component should have sufficient paper substantivity so as to be suitable for such purposes and a high degree of water solubility. Direct yellow dyes that are suitable for use in liquid black paper dye mixes of this invention include: C.I. Direct Yellow 11, C.I. Direct Yellow 12, C.I. Direct Yellow 84, C.I. Direct Yellow 107, C.I. Direct Yellow 118, C.I. Direct Yellow 119, C.I. Direct Yellow 127, C.I. Direct Yellow 131, C.I. Direct Yellow 134, C.I. Direct Yellow 137, C.I. Direct Yellow 147 and the yellow paper dyes of applicant's U.S. Pat. No. 4,285,861. For reasons of economy and performance properties in the liquid dye formulations of this invention, C.I. Direct Yellow 107 is preferred as the direct yellow dye to be used in combination with the Structure I and II compounds.

As in the case of the blue dye, and depending on the particular black hue desired, the relative concentrations of the orange, blue and yellow dyes are particularly critical and can be varied over wide ranges and still provide black to grey hues.

The invention is illustrated by the following nonlimiting examples in which the parts are expressed as parts by weight.

EXAMPLE #1

Thirty-seven parts of 4,4'-diaminostilbene-2,2'-disulfonic acid was pasted into 190 parts of water and stirred until a uniform slurry was obtained. During two hours 23.3 parts of 20° Be' hydrochloric acid was added, allowing the temperature to rise no higher than 35° C. A solution of 14.0 parts sodium nitrite in 30.0 parts water was then added during 1-2 hours, again allowing the temperature to rise no higher than 35° C. The mass was stirred an additional hour with excess nitrous acid present, at which time the excess was destroyed with sulfamic acid and the mass filtered. The yield of wet tetrazo presscake was 47.8 parts at approximately 80 percent solids.

EXAMPLE #2

To 84 parts of water containing 30.0 parts triethanolamine was added 50.8 parts of 1-(4'-sulfophenyl)-3-methyl-5-pyrazolone ("4'-SPMP", M.W. 254). The pH was adjusted to 7.5 with 6.2 parts of lithium hydroxide monohydrate (LiOH—$H_2O$), producing a dark solution. During one hour 47.8 parts of 4,4'-diaminostilbene-2,2'-disulfonic acid tetrazo presscake (as prepared in Example #1) was added portionwise, while simultaneously adding 40 parts of a 15 percent (W/V) solution of LiOH—$H_2O$ in water to maintain the pH in the range 7.3–7.8. The temperature was held below 30° C. by the addition of ice as required After stirring for one hour, the pH was raised to 8.5 by the addition of 2.0 parts LiOH—$H_2O$ (solid), and 50.0 parts of urea was added at which time a true solution was obtained. The mass was diluted with water to a total of 400.0 parts and clarified to remove particulates. The solution thus produced contained approximately 21 percent color (Calc. at M.W.=900) and dyed paper in orange shades.

EXAMPLE #3

To 150 parts of water containing 30.0 parts triethanolamine was added 63.8 parts of 1-amino-8-naphthol-3,6-disulfonic acid ("H-Acid", M.W. 319). The pH was adjusted to 7.5 with 3.0 parts LiOH—$H_2O$ (solid), producing a dark solution. During one hour 47.8 parts of 4,4'-diamino stilbene-2,2'-disulfonic acid tetrazo presscake (as prepared in Example #1) was added portionwise, while simultaneously adding 56.0 parts of a 15 percent (W/V) solution of LiOH—$H_2$) in water to maintain the pH in the range 7.3–7.8. The temperature was maintained below 30° C. by the addition of ice as required. After stirring for one hour, the pH was raised to 8.5 with 2.0 parts LiOH—$H_2O$ (solid), and 50.0 parts of urea was added at which time a true solution was obtained. The mass was diluted with water to a total of 450 parts and clarified to remove particulates. The solution thus produced contained approximately 21% color (Calc. at M.W.=1030) and dyed paper in blue shades.

EXAMPLE #4

A mixture of 60 parts of the Example #2 dye solution and 40 parts of the Example #3 dye solution was stirred until uniform. This mixture dyed paper in true black shades with excellent stability toward pH in the 3–10 range.

EXAMPLE #5

A mixture of 27.0 parts of the Example #2 dye solution, 56.1 parts of the Example #3 dye solution, and 16.9 parts of a commercially available solution of C.I. Direct Yellow 107 (containing approximately 17 percent dye) was stirred until uniform. This mixture dyed paper in true black shades with excellent stability toward pH in the 3–10 range.

EXAMPLE #6

To 250 parts of water at 70° F. was added 5.0 parts of Bleached Softwood Kraft paper pulp (brightness of 88–91 photovolt, freeness of 425–450 ml. CSF) and 2.0 parts of a 2.5 percent solution in water of rosin size, and the slurry was mixed for five minutes with a paddle stirrer. The appropriate amount of a dye solution according to Example #5 (as a 0.25 percent solution in water) was added to obtain the desired depth of shade and stirring was continued for 20 minutes. The pH of the slurry was adjusted to 4.5 with alum and after 5 minutes additional stirring, a hand sheet was formed, adjusting the pH of the water in the sheet mould to 4.5 with alum. The handsheet so formed was pressed between blotters at 500 p.s.i. and dried between clean blotters on a drum drier at a surface temperature of 210°–215° F.

The handsheets produced in the above manner exhibited shades ranging from light grey to full black.

When the above procedure was performed without pH adjustment, the dyed sheets also exhibited superior shade stability with regard to application pH.

I claim:

1. An aqueous dye solution containing the following:
(a) a compound having the structure:

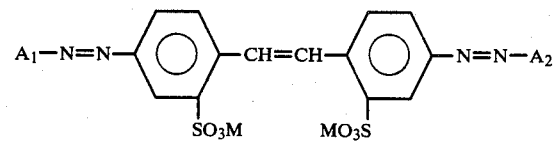

wherein $A_1$ and $A_2$ can be the same or different and represent the residue of a phenylpyrazolone compound having the following structure:

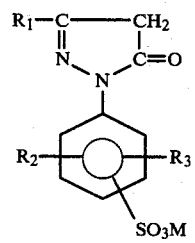

wherein:

$R_1$ is —$CH_3$, —COOH and —COO-lower alkyl;

$R_2$ and $R_3$ independently of one another represent —H, -lower alkyl, -lower alkoxy and -halogen; and M represents the same or different water solubilizing cations; and (b) a water soluble direct blue dye.

2. An aqueous dye solution according to claim 1 wherein the blue dye has the structure:

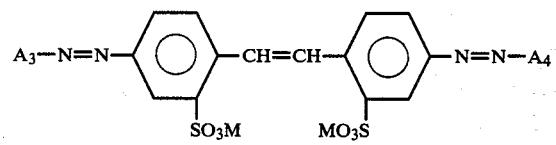

wherein $A_3$ and $A_4$ are the same or different substituents selected from the following:

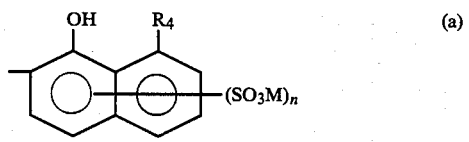

wherein $R_4$ is —OH or —$NH_2$; n is 1 or 2 and M is a water solubilizing cation; or

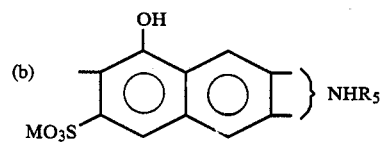

wherein R₅ is —H, -lower alkyl, -phenyl, —CO Alkyl, —CO Aryl or —CH₂COOH and M is a water solubilizing cation.

3. An aqueous dye solution according to claim 2 wherein A₃ and A₄ are:

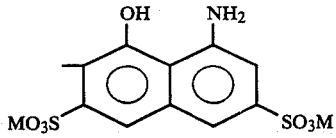

4. An aqueous dye solution according to claims 2 or 3 wherein the water solubilizing substituents are —Na, —Li and —N(CH₂CH₂OH)₃.

5. An aqueous solution according to any of claims 1 to 4, and also containing a water-soluble direct yellow dye.

6. An aqueous solution according to claim 5 wherein the direct yellow dye does not include a phenolic hydroxyl group as a substituent.

7. An aqueous solution according to claims 5 or 6 wherein the yellow dye has an affinity for cellulosics.

8. An aqueous solution according to claim 7 wherein the yellow dye is C.I. Direct Yellow 107.

9. An aqueous solution according to claim 7 containing:

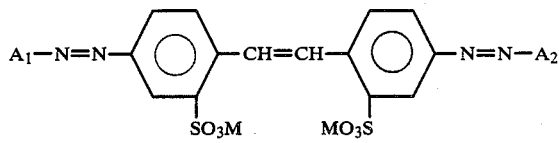

wherein A₁ and A₂ can be the same or different and represent the residue of a phenylpyrazolone compound having the following structure:

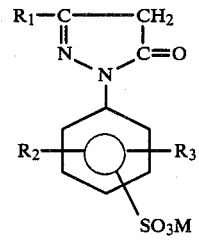

wherein:
R₁ is —CH₃, —COOH and —COO-lower alkyl;
R₂ and R₃ independently of one another represent —H, -lower alkyl, -lower alkoxy and -halogen; and
M represents the same or different water solubiliz-

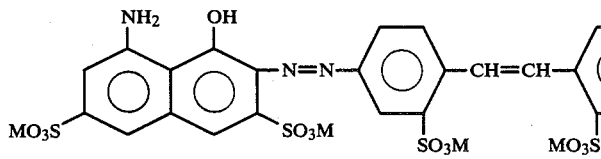

(a)

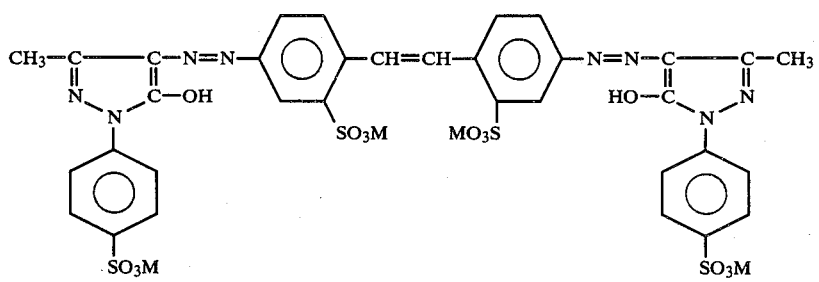

(b)

(c) C.I. Direct Yellow 107; and
(d) —Na, —Li and —N(CH₂CH₂OH)₃ as water solubilizing cations.

10. An aqueous dye solution according to any of claims 1 to 9 inclusive, and also containing urea.

11. The method of dyeing cellulosic materials which comprises treating the material with an aqueous solution of any of claims 1 to 10 inclusive.

12. The method according to claim 11 wherein the cellulosic material is paper.

13. Cellulosic material dyed by the method of claim 11.

14. Paper dyed by the method of claim 12.

15. Cellulosic material carrying a compound having the structure ing cations.

16. Paper carrying a compound having the structure:

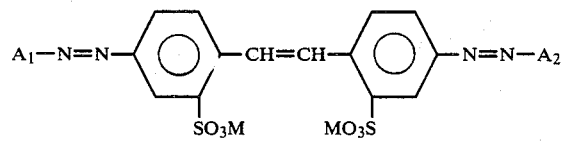

wherein A₁ and A₂ can be the same or different and represent the residue of a phenylpyrazolone compound having the following structure:

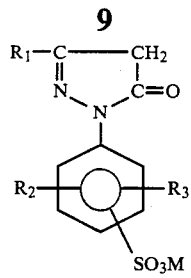
wherein:
R$_1$ is —CH$_3$, —COOH and —COO-lower alkyl;
R$_2$ and R$_3$ independently of one another represent —H; -lower alkyl, -lower alkoxy and -halogen; and
M represents the same or different water solubilizing cations.
17. The cellulosic material of claim 15 also carrying a water soluble direct blue dye.
18. The paper of claim 16 also carrying a water soluble direct blue dye.
* * * * *